Feb. 13, 1968 W. E. SHULTZ 3,368,266
RAPID POSITIONING AND CLAMPING APPARATUS
Filed Jan. 19, 1966
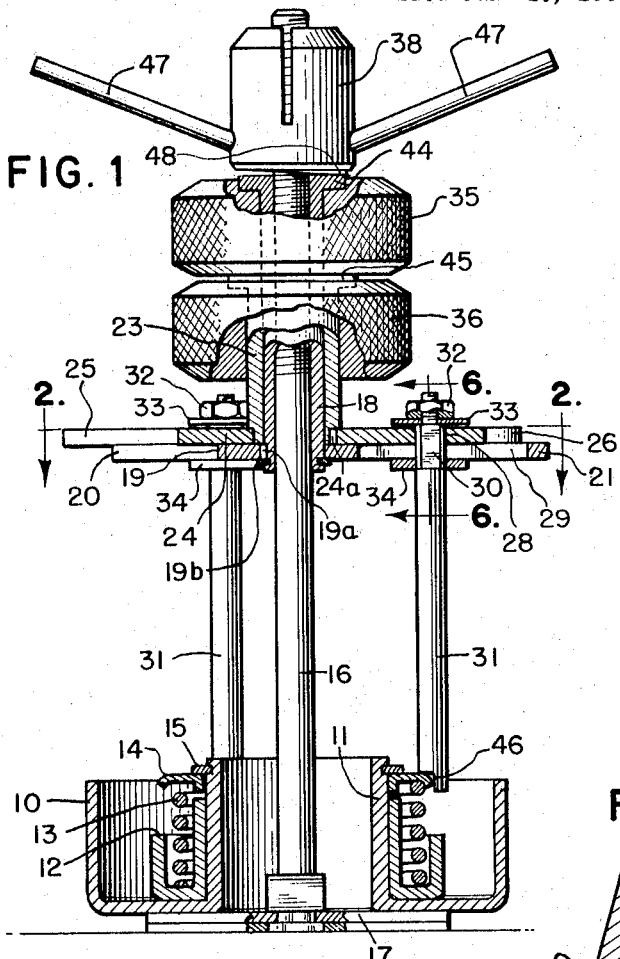
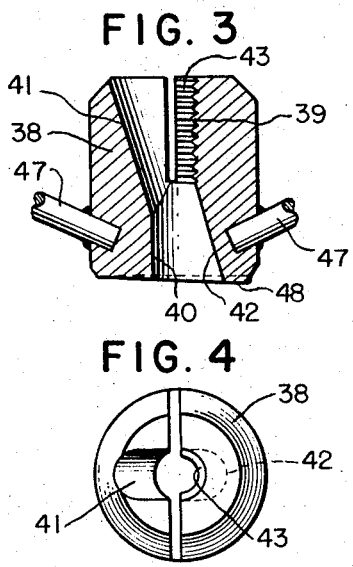
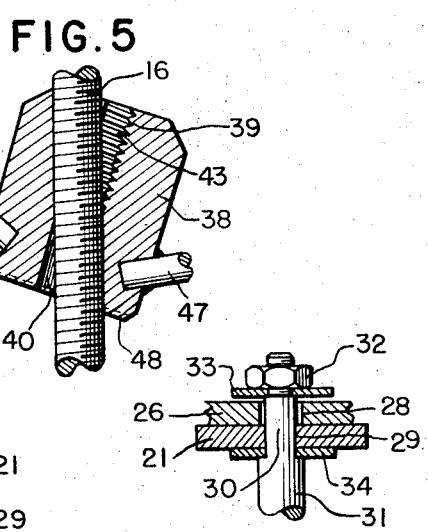
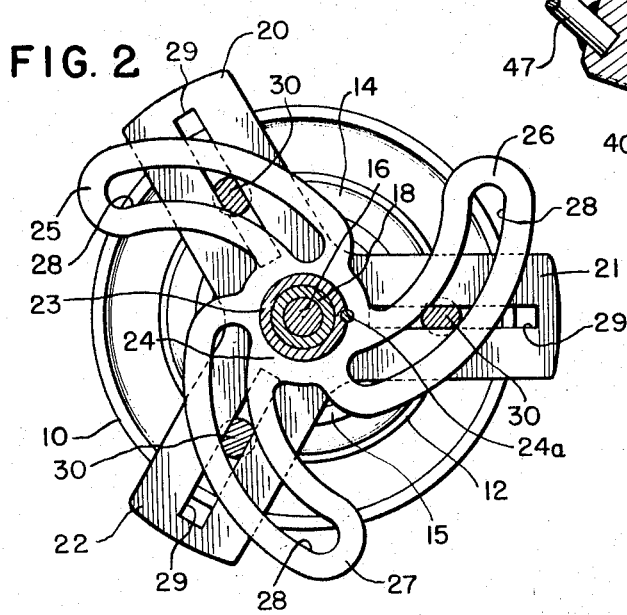
INVENTOR.
William E. Schultz
BY *Stanley Hoods*
Attorney

United States Patent Office 3,368,266
Patented Feb. 13, 1968

3,368,266
RAPID POSITIONING AND CLAMPING
APPARATUS
William E. Shultz, 239 N. Main St.,
Lombard, Ill. 60148
Filed Jan. 19, 1966, Ser. No. 521,696
8 Claims. (Cl. 29—200)

This invention relates to a rapid positioning and clamping device.

It is an object of this invention to provide a rapid positioning and clamping device having novel features of design and construction incorporated therein which makes it especially useful in facilitating assembly and disassembly operations on the clutch piston assembly of conventional automatic transmission clutch units as well as other articles of work.

It is also an object of this invention to provide an adjustable clamping device in which the rapid positioning and clamping engagement to fit various sized articles of work may be accomplished more rapidly than with devices of this type heretofore available.

A still further object of the invention is to provide a rapid positioning and clamping device of the character indicated which will be durable and efficient in use, and that will be simple and easy to manufacture.

With these and other objects in view, the invention consists in the novel construction, arrangement and design of parts, which will be hereinafter more specifically described, claimed and illustrated in the accompanying drawings, in which:

FIG. 1 is a side elevational view, with portions in section, of a clamping device embodying the features of this invention.

FIG. 2 is a section taken along line 2—2 of FIG. 1. with portions shown in elevation.

FIG. 3 is an enlarged sectional view of a control member with which the clamping device of this invention is equipped to provide for rapid adjustment.

FIG. 4 is a top plan view of the control member shown in FIG. 3.

FIG. 5 is an enlarged sectional view of the control member shown in FIG. 3 as it appears in relation to the clamping device of this invention when in a position to effect rapid adjustment.

FIG. 6 is a vertical section taken along line 6—6 of FIG. 1.

Reference being had to FIG. 1 of the drawings, will be noted that an example of a clamping device incorporating the features of the present invention is shown as applied to the clutch piston assembly of a conventional automatic transmission clutch unit including a drum 10, a central tubular hub portion 11, a piston 12 fitted about the hub portion 11, and a coil spring which acts against the piston 12 in the direction of the drum under control of a spring seat 14 and a spring seat retainer 15 engaging the hub portion 11.

In a clamping device exemplifying the present invention as shown in the drawings, a threaded stem or shaft 16 has one end thereof secured to a base or platform 17 so as to occupy a central upright position in relation to the base. The shaft 16 is of such length as to project upwardly beyond the confines of the drum 10 when the latter is in a position to undergo action of the clamping device wherein the face of the drum has downward seating engagement on the upper surface of the base 17 as shown in FIG. 1. The portion of the shaft 16 thus situated above the confines of the drum 10 receives a bushing 18 having axial sliding engagement with the shaft. The bushing 18 together with a bracket having a hub portion 19 to which the bushing 18 is fixed via a pin 19ª and key 19ᵇ at the end of the bushing facing in the direction of the base 17 provide an assembly having guided sliding movement along the shaft 16 toward and away from the work seated on the base 17. Arms 20, 21 and 22 forming uniform radial extensions of the hub portion 19 of the bracket occupy positions in uniformly circumferentially spaced apart relation about a circle with which the axis of the shaft 16 is concentric. Sleeve 23 supported for rotation about the outer cylindrical surface of the bushing 18 has a lower end portion to which a rotor having a hub portion 24 is fixed via a pin 24ª. Radial extensions of the hub portion 24 define lobes 25, 26 and 27 which, like arms 20, 21 and 22 occupy positions in uniformly circumferentially spaced apart relation about a circle with which the axis of the shaft 16 is concentric and also have sliding support on the upper surfaces of the arms 20, 21 and 22 while either the bushing 18 or the sleeve 23 is rotated relative to the other. Each of the lobes 25, 26 and 27 is recessed to form an arcuate slot 28. These slots 28 are arranged symmetrically about the hub 24 of the rotor while occupying positions in eccentric relation to the axis of rotation of the rotor. A straight slot 29 formed in each of the arms 20, 21 and 22 of the bracket secured to the bushing 18 extending radially of said bushing are so arranged as to have intersecting relation with the slot 28 in the arm of the rotor in overhead relation thereto. Accordingly, each slot 28 in the arms of the rotor and the slot 29 in the arm of the bracket with which it is paired combined to form a passage for the reception of a shank 30 forming a reduced upward extension of a spindle 31. A portion of the shank 30 projecting upwardly through the slots with which it is associated is threaded for receiving a nut 32. A washer 33 between the nut 32 and the upper surface of the rotor lobe along the slot through which the shank 30 projects, and washer 34 between the lower surface of the arm bordering the slot containing the shank 30 and a shoulder at the lower end of the shank 30, cooperate to support the spindle 31 in fixed position axially of the spindle along a line paralleling the axis of the shaft 16. The slots in the lobes of the rotor are effective to exert a camming action against the surfaces of the spindle shanks contained in the slots whereby the spindles 31 are simultaneously moved along the slots 29 in the arms 20, 21 and 22 of the bracket toward and away from the shaft 16 in response to rotary movement of either the rotor or the bracket relative to the other. It will be noted that the bushing 18 extends upwardly beyond the upper limits of the sleeve 23. A knob 35 of nylon or other suitable material fixed to said upper end of the bushing 18 occupies a position directly above a similar knob 36 fixed to the upper end of the sleeve 23. The knob 36 is accordingly operable to control the rotated position of the rotor while the knob 35 is available to control the position of the bracket arms and thereby establish the position of the spindles 31 relative to the shaft 16.

The position and pressure applied via the spindles 31 upon the work piece in accordance with variations in the vertical as well as horizontal dimension of the work pieces from time to time successively placed about the shaft 16 of the work holder are regulated by a control member 38 having a bore in which the portion of the shaft 16 above the knob 35 is received. The bore thus provided in the control member has its inner surface defined by wall portions 39 and 40 which are of semi-cylindrical segmental contour in axial alignment with the axis of and conforming to the contour of a common cylinder matching the cylindrical contour of the shaft 16 as well as wall portions 41 and 42 respectively opposite to and paired with the wall portions 39 and 40. The wall portions 41 and 42 are likewise of semi-cylindrical segmental contour in axial alignment with the axis of and conforming to the contour of a common cylinder matching the cylindrical contour of the shaft 16. However, the wall portions thus identified as 41 and 42 occupy a position wherein the axis thereof intersects the axis of the wall portions 39 and 40 approximately coincident with a line separating the wall portions 39 and 40. The wall portions accordingly defining the inner surface of the bore in the control member are smooth except for threads 43 on the wall portion 39 which have intermeshing engagement with the threads of the shaft 16. Therefore, when the control member occupies a position wherein the wall portions 39 and 40 occupy a position paralleling the axis of the shaft 16 as shown in FIG. 1, the control member may be rotated to cause the threads on the shaft to feed the control member into tightened engagement with the flanged portion 44 at the end of the bushing 18 which presents an upwardly facing surface in slightly upwardly offset relation to the upper surface of the knob 35. A similar flanged portion 45 at the end of the sleeve 23 presents an upwardly facing surface in slightly upwardly offset relation to the upper surface of the knob 36 fixed to the sleeve 23. The flange 45 accordingly provides a bearing with which the undersurface of the knob 35 has smooth sliding engagement to facilitate rotation of the knob 35 or the knob 36 relative to the other while the flange 44 furnishes a suitable bearing with which the undersurface of the control member has engagement to establish a tightened engagement between the spindles 31 and the surface of the work piece operatively positioned below said spindles.

When, however, the control member is tilted as shown in FIG. 5, to occupy a position wherein the wall portions 41 and 42 are parallel to the axis of the shaft, the threads 43 on the control member are freed of engagement with the threads on the shaft 16. Such freedom from engagement with the threads of the shaft 16 allows the control member to be quickly released from a clamping position in relation to the spindles 31 without requiring laborious repeated turning of the control member and thus enabling the operator to quickly adjust the spindles 31 toward and away from the article of work situated thereunder. It will be noted that a notch formed at the lower end of each spindle 31 defines a keeper 46 with which the rim of the spring seating ring 14 has upward as well as outward engagement radially of the shaft 16 and thereby maintaining the spindles in firm gripping engagement with the ring 14 during axial adjustment of the spindles toward final clamping position in relation to the work.

Handles 47 secured to the control member at opposite sides thereof and in upwardly and outwardly leaning relation to the control member provide means for easily manipulating the control member relative to the shaft 16.

To restrain any tendency of the control member from being unintentionally tilted to a release position from a threadedly engaged position on the shaft 16 while the spindles 31 are in work holding or clamping position, the surface of the control member which engages the flange 44 associated with the knob 35 is slanted downwardly toward the side of the control member which contains the threads 43. This provides a cam 48 as shown in FIG. 1 which is effective to exert added load on the threads of the control member while in intermeshing relation with the threads of the shaft 16.

It is believed apparent that the invention is not necessarily confined to the specific use or uses thereof described herein since it may be utilized for any purpose to which it may be suited. Nor is the invention to be necessarily limited to the specific construction illustrated and described since such construction is only intended to be illustrative of the principles of operation and the means presently devised to carry out said principles, it being considered that the invention comprehends any minor changes in construction that may be permitted within the scope of the appended claims.

What is claimed is:
1. A rapid positioning and clamping unit including a first clamping member, a threaded shaft to which said first clamping member is secured at a fixed position axially of said shaft, means defining a second clamping member, said means including a support unit loosely sleeved on said shaft for axial guided movement thereon toward and away from said first clamping member, a series of spindles, connecting means through which said spindles are suspended from said support unit along lines parallel to said shaft within the area between said support unit and said first clamping member and occupying positions in uniformly spaced apart relation circumferentially of circles of varying diameter with which said shaft is concentric, and control means for moving and holding said spindles in clamping engagement with an article of work while said article is disposed between said first clamping member and end portions of the spindles facing said article.

2. A rapid positioning and clamping unit according to claim 1 wherein said support unit includes a cam member and a guide member, each being rotatable relative to the other about said shaft as an axis, and said connecting means include spindle receiving guide slots in said guide member extending symmetrically radially of said shaft and spindle receiving guide slots in said cam member of uniform arcuate contour arranged symmetrically about said shaft while occupying positions in eccentric relation to said shaft.

3. A rapid positioning and clamping unit according to claim 1 wherein said support unit includes a cam member and a guide member, each being rotatable relative to the other about said shaft as an axis and the guide member being arranged intermediate said cam member and the area between said first and second clamping members, and said connecting means include spindle receiving guide slots in said guide member extending symmetrically radially of said shaft and spindle receiving guide slots in said cam member of uniform arcuate contour arranged symmetrically about said shaft while occupying positions in eccentric relation to said shaft, a guide member actuating knob, a cam member actuating knob positioned between said guide member actuating knob and said guide member, said knobs having sliding interengagement along a surface of the guide member actuating knob facing in the direction of the cam member actuating knob and said control member having sliding interengagement along a surface of the guide member actuating knob facing in a direction away from the cam member actuating knob.

4. A rapid positioning and clamping unit according to claim 1 wherein said control member is provided with a bore through which said threaded shaft is receivable, said bore being of such size as to allow said control member to tilt between a first position and a second position relative to said shaft, the wall of said bore being smooth except for a limited portion which contains threads having intermeshing relation with said threaded shaft only when said control member is in a first position.

5. A rapid positioning and clamping unit according to claim 1 wherein said control member is provided with a bore through which said threaded shaft is receivable, said bore being of such size as to allow said control member to tilt between a first position and a second position relative to said shaft, the wall of said bore being smooth except for a limited portion which contains threads having intermeshing relation with said threaded shaft only when said control member is in a first position, and said support unit occupies a position intermediate said control member and the area between said support unit and the first clamping member.

6. A rapid positioning and clamping unit according to claim 1 wherein said control means includes a control member provided with a bore through which said threaded shaft is receivable, said bore being of such size as to allow said control member to tilt between a first position and a second position relative to said shaft, the wall of said bore being smooth except for a limited portion which contains threads having intermeshing relation with said threaded shaft only when said control member is in a first position, said support unit occupying a position intermediate said control member and the area between said support unit and the first clamping member and presenting a bearing surface with which said control member has sliding engagement to effect clamping engagement of said spindles with an article of work disposed between said first clamping member and said spindles.

7. A rapid positioning and clamping unit having a first clamping member and a second clamping member, a threaded shaft to which said first clamping member is secured in fixed axial relation to said shaft and to which said second clamping member is coupled for guided movement axially of said shaft toward and away from said first clamping member, a control member having a bore through which said shaft extends, said bore having first and second wall portions of semi-cylindrical segmental contour in axially aligned relation to the axis of and conforming to the contour of a common cylinder matching the cylindrical contour of the shaft and occupying separate areas of the bore in relatively offset positions axially of said common cylinder at opposite sides of a plan containing the axis of said common cylinder, means through which said control member is effective to clamp said second clamping member in the direction of said first clamping member and thereby establish a clamped relation between said clamping members and an article of work positioned between said clamping members, said means including threads only on the one of said wall portions of the bore most distanced from said second clamping member with which said shaft has threaded engagement when the axis of the cylinder common to said first and second wall portions is in alignment with the axis of the shaft, said bore having third and fourth wall portions of semi-cylindrical segmental contour which follow the contour of a common cylinder matching the semi-cylindrical contour of and respectively opposite said first and second wall portions and having an axis with which the axis of the cylinder common to said first and second wall portions of the bore has intersection within a zone separating said first and second wall portions, said third and fourth wall portions thereby providing for tilting said control member about said intersection to free said shaft from said threaded wall portion of the bore enabling said control member to have sliding engagement with the shaft along said third and fourth wall portions of the bore for quick adjustment of the control member axially of said shaft.

8. A clamping unit according to claim 7 wherein said second clamping member and said control member have sliding interengagement along a surface of said control member which is slanted in a direction away from said threaded wall portion toward the side of the control member containing said threaded wall portion.

References Cited

UNITED STATES PATENTS

| | | |
|---|---|---|
| 1,580,426 | 4/1926 | Farnam. |
| 3,114,199 | 12/1963 | Flodberg. |
| 3,121,280 | 2/1964 | McFadden. |
| 3,289,268 | 12/1966 | De Bernardis. |

THOMAS H. EAGER, *Primary Examiner.*